(12) United States Patent
McKay et al.

(10) Patent No.: US 10,578,039 B2
(45) Date of Patent: Mar. 3, 2020

(54) PROACTIVE CATALYST HEATING

(71) Applicant: Continental Automotive Systems, Inc., Auburn Hills, MI (US)

(72) Inventors: Brian McKay, West Bloomfield, MI (US); Ben Bargman, Beverly Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 159 days.

(21) Appl. No.: 15/686,201

(22) Filed: Aug. 25, 2017

(65) Prior Publication Data

US 2019/0063352 A1 Feb. 28, 2019

(51) Int. Cl.
| | |
|---|---|
| *F02D 41/02* | (2006.01) |
| *B01D 53/94* | (2006.01) |
| *F01N 3/08* | (2006.01) |
| *F01N 3/10* | (2006.01) |
| *F01N 3/20* | (2006.01) |
| *F01N 3/30* | (2006.01) |
| *F01N 3/32* | (2006.01) |
| *F01N 3/36* | (2006.01) |
| *F02M 25/08* | (2006.01) |
| *F02D 41/00* | (2006.01) |
| *F02D 41/04* | (2006.01) |

(52) U.S. Cl.
CPC ....... *F02D 41/025* (2013.01); *B01D 53/9454* (2013.01); *F01N 3/0835* (2013.01); *F01N 3/101* (2013.01); *F01N 3/2006* (2013.01); *F01N 3/2013* (2013.01); *F01N 3/2033* (2013.01); *F01N 3/303* (2013.01); *F01N 3/32* (2013.01); *F01N 3/36* (2013.01); *F02D 41/0035* (2013.01); *F02M 25/0836* (2013.01); *F01N 2240/16* (2013.01); *F01N 2610/03* (2013.01); *F01N 2610/102* (2013.01); *F02D 41/042* (2013.01)

(58) Field of Classification Search
CPC ...... F01N 3/0835; F01N 3/101; F01N 3/2013; F01N 3/303; F01N 3/32; F01N 2610/102
See application file for complete search history.

(56) References Cited

U.S. PATENT DOCUMENTS 5,467,594 A * 11/1995 Aoki ............... F01N 3/0835
60/276
5,979,157 A * 11/1999 Kinugasa ......... F01N 3/0238
60/274

(Continued)

*Primary Examiner* — Audrey K Bradley (57) ABSTRACT

A proactive heating system for a vehicle, which is used to increase the temperature of an exhaust catalyst prior to ignition of an engine to reduce emissions. The proactive heating system is part of an exhaust system for a vehicle, and includes an electrically heated catalyst and an air pump, which are activated prior to engine ignition, to increase the temperature of a three-way catalyst such that the three-way catalyst is at the desired target threshold temperature, or light-off temperature, prior to engine ignition, eliminating the delay in emissions treatment after cold-start of the engine. The proactive heating system addresses the high level of untreated emissions emitted from an internal combustion engine before the catalytic emissions system reaches the light-off temperature. The proactive heating system provides heating of a catalyst to light-off temperature without combusting hydrocarbon fuel, which leads to engine out emissions.

7 Claims, 8 Drawing Sheets

(56) References Cited

U.S. PATENT DOCUMENTS

| | | | |
|---|---|---|---|
| 7,895,825 B2 * | 3/2011 | Kang | F01N 3/22 60/274 |
| 8,776,500 B2 * | 7/2014 | Gonze | F01N 9/00 60/286 |
| 2012/0204536 A1 * | 8/2012 | Gonze | F01N 3/2026 60/273 |
| 2018/0291784 A1 * | 10/2018 | Achenback | |

* cited by examiner

PROACTIVE CATALYST HEATING

FIELD OF THE INVENTION

The invention relates generally to a proactive heating system, which is part of an exhaust system, and is used to increase the temperature of an exhaust catalyst prior to ignition of an engine to reduce emissions and optimize fuel efficiency.

BACKGROUND OF THE INVENTION

Efforts have been made to reduce emissions in the exhaust gas produced by internal combustion engines. One of the components in the exhaust system for a vehicle used for reducing emissions is an exhaust catalyst. One type of catalyst is referred to as a "three-way catalyst." A three-way catalyst performs three different conversions of various exhaust emissions. One type of conversion is the reduction of nitrogen oxides to nitrogen and oxygen, another type of conversion is the oxidation of carbon monoxide to carbon dioxide, and the third conversion is the oxidation of unburnt hydrocarbons (HC) to carbon dioxide and water.

A catalyst is most effective at controlling exhaust emissions when the catalyst is at the desired target threshold temperature, or "light-off" temperature. However, when engine ignition first occurs, the engine produces the highest amount of emissions, and the catalyst is typically at ambient temperature (or some other temperature which is well below light-off temperature), such that the catalyst is less effective at reducing emissions just after engine ignition.

Many attempts have been made to improve the efficiency of the catalyst. One of these past solutions has been to increase the rate at which the temperature of the catalyst increases. Another solution has included using the engine exhaust gas to provide heat to increase the temperature of the catalyst.

Some existing solutions incorporate the use of engine exhaust gas as part of the formula to create heat in the catalyst bed. One of the drawbacks to these strategies is that the catalyst is below the "light-off" temperature, where conversion of emissions is greatest, resulting in poor emissions during the initial period.

Accordingly, there exists a need for proactive heating of the catalyst, such that the catalyst is at light-off temperature prior to engine ignition.

SUMMARY OF THE INVENTION

This present invention is a proactive heating system which is part of an exhaust system for a vehicle, and is used to increase the temperature of an exhaust catalyst prior to ignition of an engine to reduce emissions.

The proactive heating system of the present invention includes an electrically heated catalyst and an air pump, which are activated prior to engine ignition, to increase the temperature of a catalyst such that the catalyst is at the desired target threshold temperature, or "light-off" temperature, prior to engine ignition, eliminating the delay in emissions treatment that normally exists after cold-start ignition of the engine.

It is therefore an object of this invention to address the high level of untreated emissions emitted from an internal combustion engine before the catalytic emissions system reaches the light-off temperature. It is another object of this invention to heat, or acclimate, a catalyst to light-off temperature, combusting hydrocarbon fuel, which leads to reduced engine out emissions.

In an embodiment, the proactive heating system includes two main components which are added to a catalytic emissions system, these components are an electrically heated catalyst (eHC) and an air pump. Both of these components are activated for a predetermined amount of time prior to engine ignition. The eHC is located upstream of the main catalyst, and provides the heat needed to increase the temperature of the main catalyst to light-off temperature, while the air pump transfers air into an area of an exhaust pipe upstream of both catalysts. The moving air then transfers the heat from the eHC to the main catalyst. In one embodiment, the main catalyst is a three-way catalyst, but it is within the scope of the invention that other types of catalysts may be used.

One advantage of the present invention is that the catalytic emissions system is prepared for operation before ignition of the internal combustion engine. This allows for a reduction of harmful emissions to the atmosphere during warm-up of the engine. The proactive heating system of the present invention may be useful in any field that uses internal combustion engines that are routinely started from a cold state.

One embodiment of this invention includes an internal combustion engine with a filtered atmospheric air source for an intake, where a portion of the air from the air source is directed into the stream of exhaust gas by the air pump. In an alternate embodiment, instead of the air pump drawing fresh air from the filtered engine intake, the air pump draws air from its own filtered intake, or from the EVAP canister. Pulling from the EVAP canister decreases the warm-up process by providing an exothermic reaction from the fuel vapors.

The exhaust gas from the engine is directed first through an electrically heated catalyst (eHC). Immediately downstream of the eHC is another catalyst, or main catalyst, that is not electrically heated. This main catalyst performs the majority of the catalytic conversion of the emissions. There is also an air pump that pumps air from the filtered intake system into the exhaust system upstream of the eHC. The controls are designed to activate the eHC and air pump for a designated amount of time prior to engine ignition. This is controlled based on the existing temperature of the main catalyst.

Other embodiments of this invention are also possible. The proactive heating system of the present invention may be used with a turbocharged engine, a supercharged engine, or a twin-charged engine. Further embodiments may include variations in the controls logic, variations in the air pump intake, variations on the control valving which prevents exhaust gas from reaching the air pump, and variations of the after treatment catalysts.

All controls logic which are part of the present invention include the steps of activating the eHC and air pump prior to engine ignition in order to pre-heat the main catalyst. However, variations on actuating the air pump and eHC in a staggered operation or simultaneously are advantageous for decreasing the time to light-off temperature.

Valving is used to protect the air pump from engine exhaust gasses, and prevent backflow through the pump. This valving could vary with different types of valves, and different amounts of valves. Examples include, but are not limited to, passive check valves, active solenoid valves, and active pneumatic valves.

For systems where the engine-on requirement cannot always be predicted, a hydrocarbon absorber is added to the exhaust system upstream of the air pump output.

In one embodiment, the present invention is a proactive heating system which is part of an exhaust system of an engine. The exhaust system includes an intake manifold connected to an engine, and an exhaust manifold connected to the engine. It should be noted that the proactive heating system of the present invention is also able to be used with engines that do not have an exhaust manifold. The exhaust system has an exhaust treatment device, and a front exhaust pipe providing fluid communication between the exhaust manifold and the exhaust treatment device, such that the exhaust treatment device is downstream of the exhaust manifold. An air pump is in fluid communication with the front exhaust pipe in an area of the front exhaust pipe upstream of the exhaust treatment device. The exhaust treatment device includes a three-way catalyst and an electrically heated catalyst. The air pump and the electrically heated catalyst are activated such that the air pump transfers air from atmosphere to the front exhaust pipe, the air flows through the electrically heated catalyst, and the electrically heated catalyst increases the temperature of the air, such that as the air flows through the three-way catalyst, the temperature of the three-way catalyst is increased to a predetermined temperature prior to ignition of the engine.

In one embodiment, an intake pipe is in fluid communication with the intake manifold, and the air pump is in fluid communication with the intake pipe such that a portion of the air from atmosphere flowing in the intake pipe is directed by the air pump into the front exhaust pipe.

In another embodiment, an air pump filter is included, and the air pump filter is in fluid communication with the air pump such that air from atmosphere is directed by the air pump from the air pump filter into the front exhaust pipe.

In yet another embodiment, the air pump is in fluid communication with a purge valve and a canister containing hydrocarbons. The hydrocarbons in the canister are directed into the front exhaust pipe by the air transferred by the air pump, and the purge valve controls the flow of hydrocarbons from the canister to the air pump. The electrically heated catalyst causes an exothermic reaction to the hydrocarbons, and the three-way catalyst is exposed to this exothermic reaction, increasing the temperature of the three-way catalyst.

In yet another embodiment, a hydrocarbon absorber is connected to and in fluid communication with the front exhaust pipe, and a mid-pipe is connected to and in fluid communication with the hydrocarbon absorber and the mid-pipe, such that the exhaust treatment device is downstream from the mid-pipe.

The hydrocarbon absorber is used to absorb hydrocarbons in the exhaust gas produced by the engine, and as the air pump transfers air to the mid-pipe, and hydrocarbons released from the hydrocarbon absorber are directed to the electrically heated catalyst, such that the electrically heated catalyst causes an exothermic reaction to the hydrocarbons, and the three-way catalyst is exposed to this exothermic reaction, increasing the temperature of the three-way catalyst.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
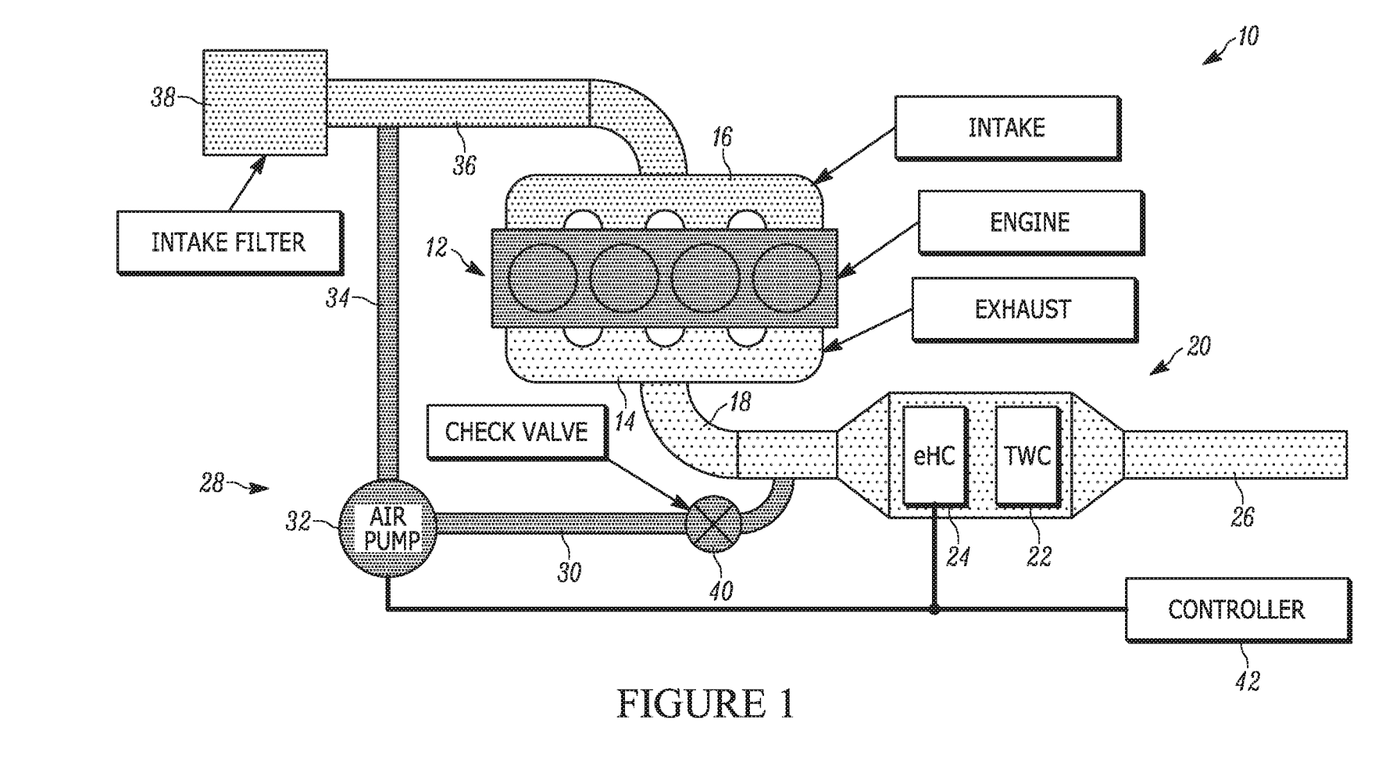
FIG. 1 is a diagram of an engine and exhaust system for a vehicle incorporating proactive catalyst heating, according to embodiments of the present invention.

A diagram of an exhaust system for an engine having a proactive heating system including a catalyst is shown in FIG. 1 generally at 10. The exhaust system 10 is connected to an engine, shown generally at 12. More specifically, the engine 12 includes an exhaust manifold 14 and an intake manifold 16. Connected to and in fluid communication with the exhaust manifold 14 is a front exhaust pipe 18, and the front exhaust pipe 18 is connected to and in fluid communication with an exhaust treatment device, shown generally at 20. The exhaust treatment device 20 includes a three-way catalyst (TWC) 22 and an electrically heated catalyst (eHC) 24. Connected to and in fluid communication with the exhaust treatment device 20 is a rear exhaust pipe 26.

Also shown in FIG. 1 is an air transfer device, shown generally at 28. The air transfer device 28 includes a first conduit 30 connected to and in fluid communication with the front exhaust pipe 18, where the first conduit 30 is also connected to and in fluid communication with an air pump 32. The air transfer device 28 also includes a second conduit 34 connected to and in fluid communication with the air pump 32. The second conduit 34 is connected to and in fluid communication with an intake pipe 36, and the intake pipe 36 receives air from the atmosphere that flows through an intake filter 38. The intake pipe 36 is also connected to and in fluid communication with the intake manifold 16. There is also a check valve 40 disposed in the first conduit 30. The check valve 40 prevents the flow of exhaust gas from the front exhaust pipe 18 to the air pump 32, but allows air pressurized air from the air pump 32 to flow through the first conduit 30, pass through the check valve 40, and flow into the front exhaust pipe 18.

There is also a controller 42 in electrical communication with the air pump 32 and the eHC 24, for controlling the activation of the air pump 32 and the eHC 24.

In operation, during a first mode of operation when the engine 12 is operating at a desired engine operating temperature, exhaust gas flows from the exhaust manifold 14, through the front exhaust pipe 18, and into the exhaust treatment device 20. The exhaust gas emitted from the engine 12 includes various emissions, which include oxides of nitrogen (NOx), carbon monoxide (CO), and unburnt hydrocarbons (HC). During this mode of operation, the TWC 22 performs most, if not all, of the catalytic conversion of these emissions. The TWC 22 is able to perform the proper catalytic conversion because the TWC 22 is at the desired TWC operating temperature, or "light-off temperature," when the engine 12 is operating at the desired engine operating temperature.

A second mode of operation occurs during the time period between ignition of the engine 12, and when the engine 12 has reached the desired engine operating temperature. During this time period, also referred to as the "warm up period," the engine 12 produces exhaust gas, and there are increased amounts of the emissions in the exhaust gas. The proactive heating system of the present invention increases the temperature of the TWC 22 prior to the second mode of operation, such that the TWC 22 is at the light-off temperature prior to ignition of the engine 12.

The TWC 22 provides the desired amount of catalytic conversion when the TWC 22 is at the desired light-off temperature. To increase the temperature of the TWC 22 to the desired light-off temperature prior to ignition of the engine 12, the air pump 32 and the eHC 24 are activated by the controller 42 prior to ignition of the engine 12, and therefore are activated prior to occurrence of the warm up period. The air pump 32 is activated such that as air from the atmosphere flows through the intake filter 38, and through the intake pipe 36, a portion of the air flows through the second conduit 34, the air pump 32, through the first conduit 30 and the check valve 40, and into the front exhaust pipe 18. The air then flows through the eHC 24, where the eHC 24 increases the temperature of the air flowing through the eHC 24. The heated air then passes through TWC 22, which then increases the temperature of the TWC 22 to the desired light-off temperature. The TWC 22 is therefore heated to the desired light-off temperature prior to ignition of the engine 12. Once ignition of the engine 12 occurs, and the engine 12 produces exhaust gas during the second mode of operation, the TWC 22 is able to provide the desired catalytic conversion of the emissions during the second mode of operation.

Figure 2:
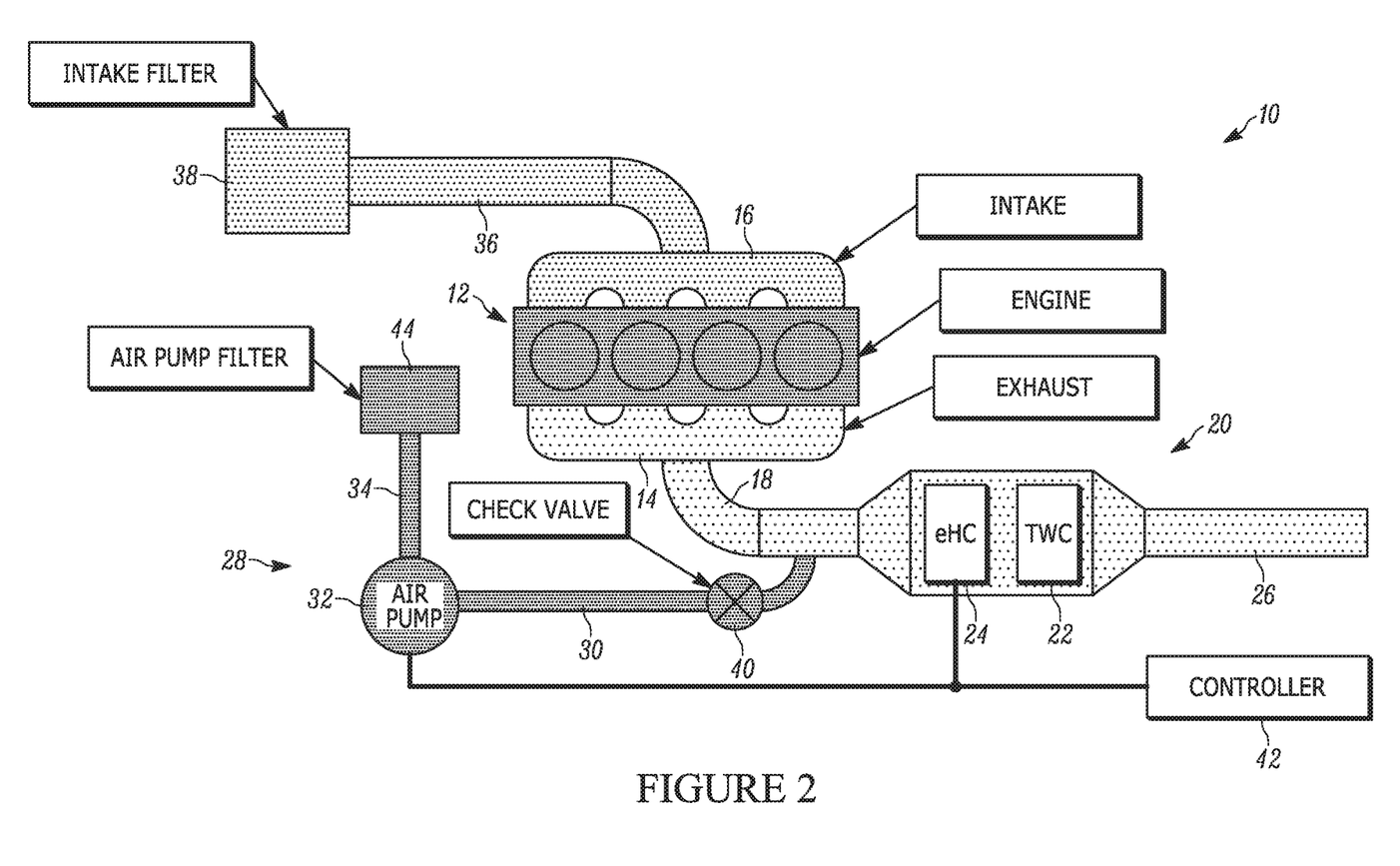
FIG. 2 is a diagram of an engine and exhaust system for a vehicle incorporating a second embodiment of proactive catalyst heating, according to embodiments of the present invention.

An alternate embodiment of the invention is shown in FIG. 2, with like numbers referring to like elements. In this embodiment, the second conduit 34 is connected to and in fluid communication with an air pump filter 44, where the air pump filter 44 and second conduit 34 provide a separate flow path for the air from atmosphere into the air pump 32.

Figure 3:
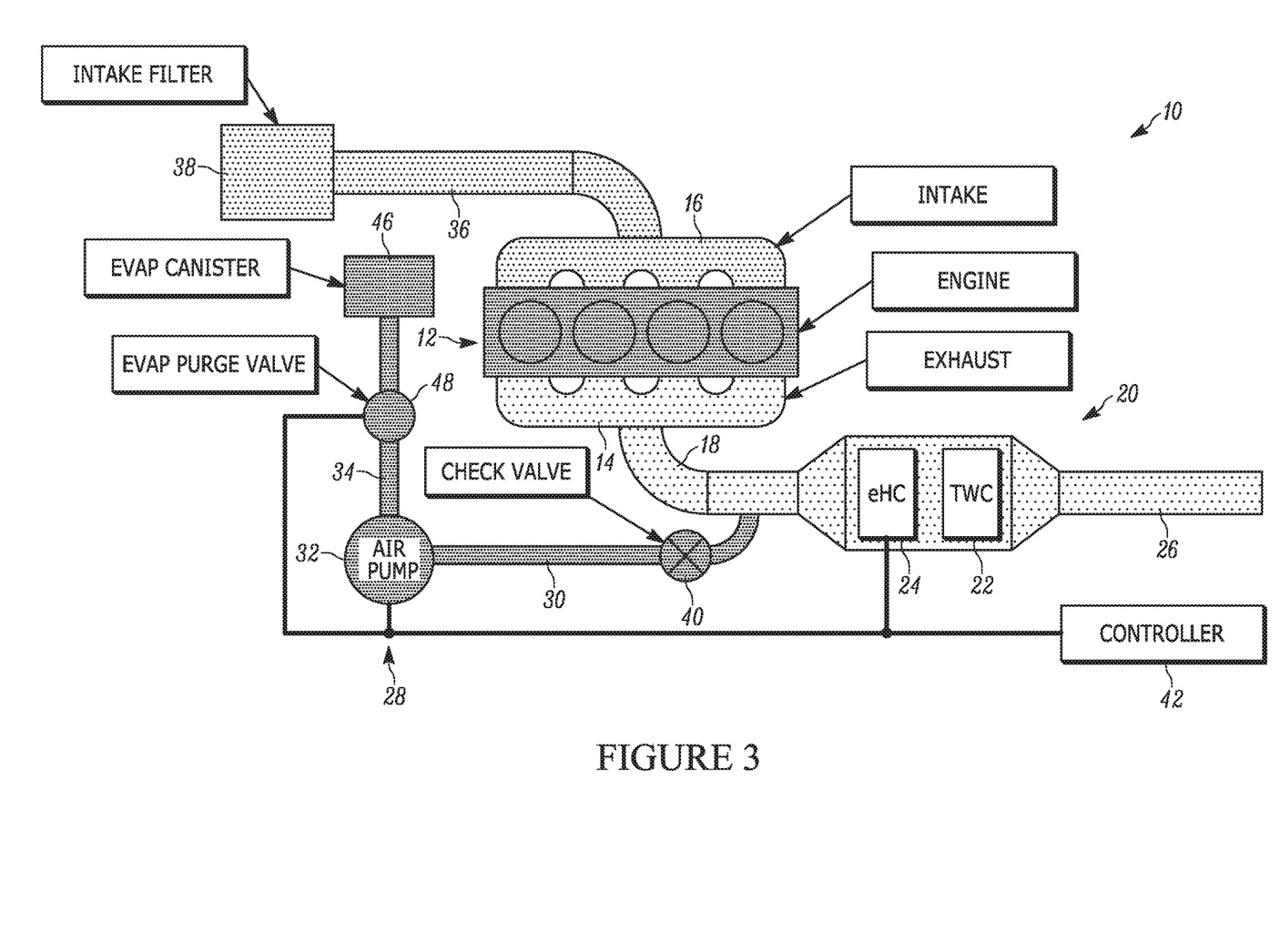
FIG. 3 is a diagram of an engine and exhaust system for a vehicle incorporating a third embodiment of proactive catalyst heating, according to embodiments of the present invention.

Another alternate embodiment of the invention is shown in FIG. 3, with like numbers referring to like elements. In this embodiment, instead of using the air pump filter 44, there is an evaporative (EVAP) canister 46 connected to and in fluid communication with the second conduit 34, and there is an EVAP purge valve 48 disposed in the second conduit 34 between the EVAP canister 46 and the air pump 32. In addition to the air pump 32 and the eHC 24, in this embodiment the controller 42 also controls the EVAP purge valve 48.

The EVAP canister 46 contains hydrocarbon vapors from the fuel tank of the vehicle. During operation of the embodiment shown in FIG. 3, as the air pump 32 transfers air through the first conduit 30 into the front exhaust pipe 18, this forced movement of air also draws the hydrocarbons from the EVAP canister 46 into the air pump 32. The EVAP purge valve 48 is used to control the flow of hydrocarbons from the EVAP canister 46 to the air pump 32. Air and hydrocarbons flow through the first conduit 30 and into the front exhaust pipe 18. As with the previous embodiment, the eHC 24 is heated to a desired temperature. However, in the embodiment shown in FIG. 3, the heat from the eHC 24 causes the hydrocarbons to have an exothermic reaction, which increases the rate at which the temperature of the TWC 22 is increased to the desired light-off temperature.

Figure 4:
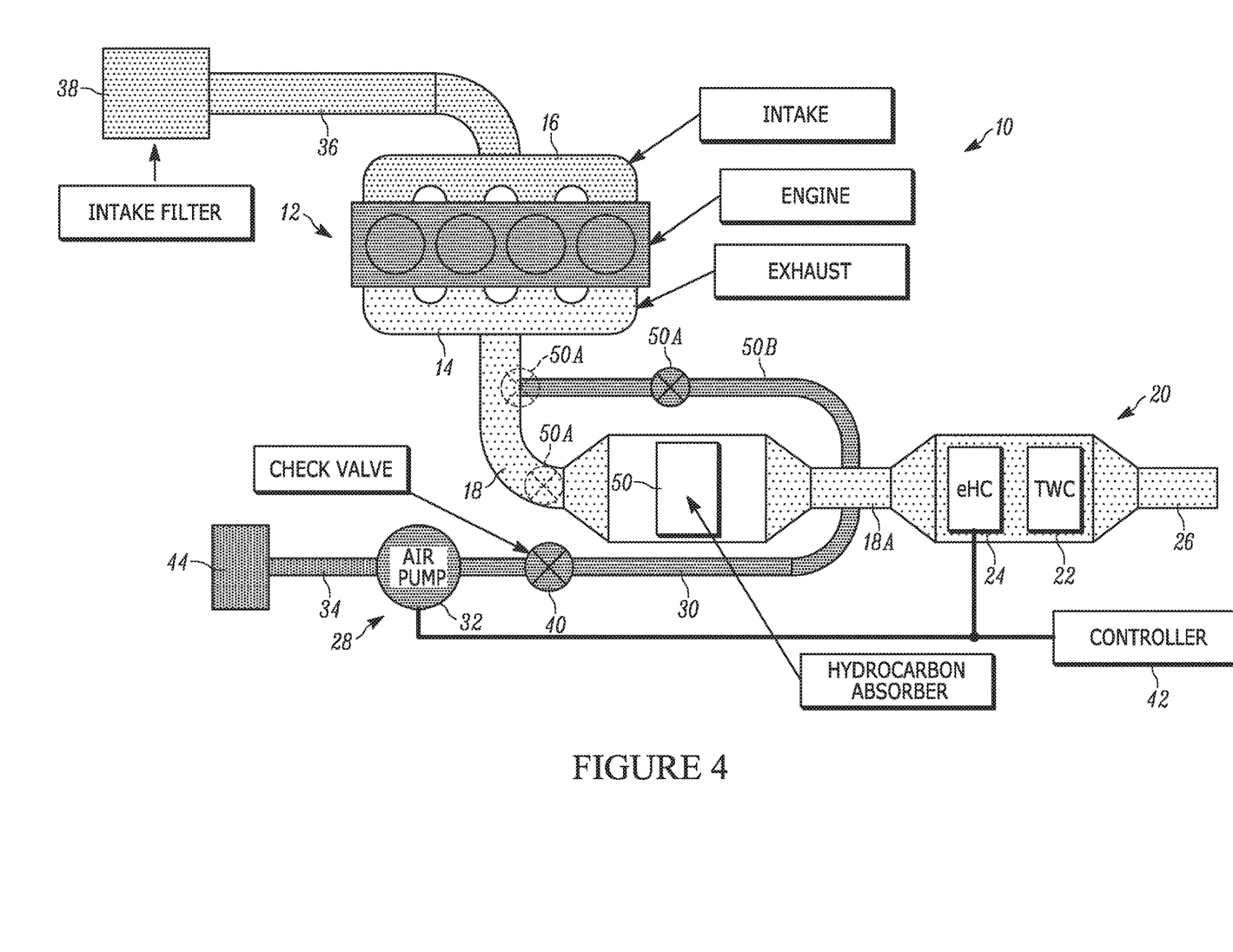
FIG. 4 is a diagram of an engine and exhaust system for a vehicle incorporating a fourth embodiment of proactive catalyst heating, according to embodiments of the present invention.

Another alternate embodiment of the invention is shown in FIG. 4, with like numbers referring to like elements. In this embodiment, the air pump 32 draws air from the atmosphere through the air pump filter 44, but it is within the scope of the invention that the air pump 32 may draw air from the intake pipe 36, or the EVAP canister 46. There is a hydrocarbon absorber 50 connected to and in fluid communication with the front exhaust pipe 18, and there is a mid-pipe 18A connected to and in fluid communication with the hydrocarbon absorber 50 and the exhaust treatment device 20. Air enters the mid-pipe 18A from the first conduit 30 in an area downstream of the hydrocarbon absorber 50, but upstream of the exhaust treatment device 20. The hydrocarbon absorber 50 is used during operating conditions where it is difficult to predict when ignition of the engine 12 may occur, and therefore, it may not be known as to when to activate the air pump 32 and the eHC 24 to increase the temperature of the TWC 22. This may occur when a sudden increase in torque is needed, such as during an acceleration maneuver. In this embodiment, the hydrocarbon absorber 50 is used to absorb hydrocarbons in the exhaust gas flowing from the exhaust manifold 14 after ignition of the engine 12 and until the TWC 22 has reached the desired light-off temperature. In this embodiment, it is possible to turn on the eHC 24 at the point of ignition of the engine 12 to decrease the time needed for the TWC 22 to reach the desired light-off temperature. The hydrocarbon absorber 50 includes a coating which is most effective at trapping hydrocarbons at low temperatures, which occur prior to the TWC 22 reaching light-off temperature. However, as the temperature of the hydrocarbon absorber 50 increases, the hydrocarbon absorber 50 releases the hydrocarbons. Once the hydrocarbon absorber 50 has reached a temperature such that hydrocarbons are released, the TWC 22 has reached the light-off temperature, and performs the required catalytic functions.

In an alternate embodiment, an additional bypass valve 50A may be included to allow the exhaust gas to bypass the hydrocarbon absorber 50. The bypass valve 50A is controlled by the controller 42, and the bypass valve 50A is changed from a closed configuration to an open configuration once the TWC 22 has reached light-off temperature. The bypass valve 50A may be located in a bypass conduit 50B, or the bypass valve 50A may be located in various locations in the front exhaust pipe 18, as shown in FIG. 4. The bypass valve 50A when located either in the bypass conduit 50B, or in an alternate embodiment, in the front exhaust pipe 18 at the inlet of the hydrocarbon absorber 50, functions as an "on-off" type of shut-off valve. In another alternate embodiment, when the bypass valve 50A is located in the front exhaust pipe 18 at the inlet of the bypass conduit 50B, the bypass valve 50A is able to control the flow of exhaust gas through either the front exhaust pipe 18 or the bypass conduit 50B.

Additionally, the size of the hydrocarbon absorber 50 may be varied to be suitable for different engines and exhaust systems. Different types of three-way catalysts may require different times to reach light-off temperature, and different types of engines may produce different levels of emissions. The size of the hydrocarbon absorber 50 may be varied to be suitable for the amount of hydrocarbons produced by the engine 12 and the time required for the TWC 22 to reach the light-off temperature.

With regard to the embodiments shown in FIG. 1-3, as mentioned above, to increase the temperature of the TWC 22 to the desired light-off temperature prior to ignition of the engine 12, the air pump 32 and the eHC 24 are activated prior to ignition of the engine 12, and therefore are activated prior to occurrence of the warm up period. However, in order to determine when to activate the air pump 32 and the eHC 24, the time at which ignition of the engine 12 occurs is also needed, so the air pump 32 and the eHC 24 may be activated prior to ignition of the engine 12.

Figure 5:
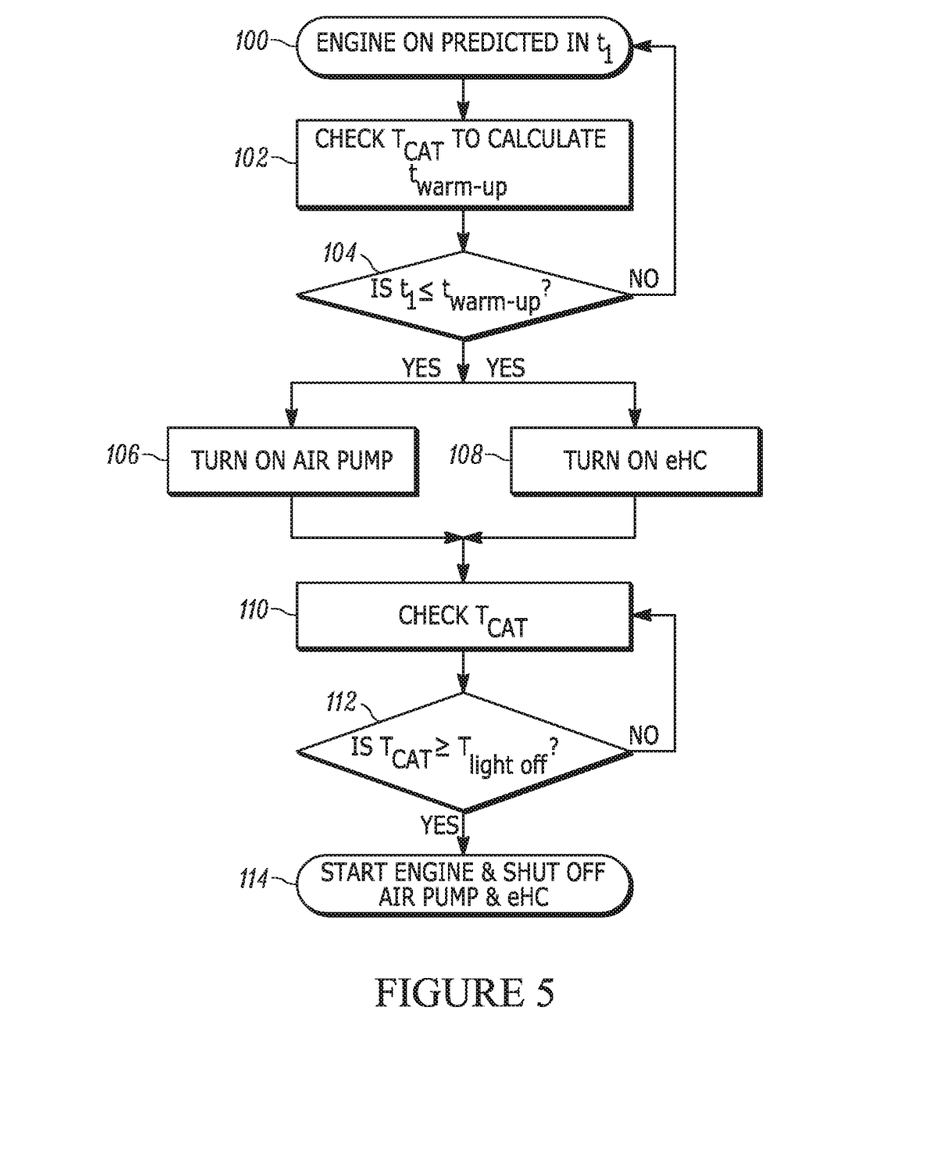
FIG. 5 is flow chart showing a first example of the steps performed by an exhaust system having a proactive catalyst heating system, according to embodiments of the present invention.

An example of the steps used in the determination of when to activate the air pump 32 and the eHC 24 prior to ignition of the engine 12, and how long the air pump 32 and eHC 24 should remain active is shown in FIG. 5. At the first step 100, it is predicted as to when ignition of the engine 12 is going to occur at some point in the future, and designated as time $t_1$. The TWC 22 has a desired TWC operating temperature as mentioned above, also referred to as the "light-off" temperature, designated "$T_{lightoff}$." At step 102, a determination is made as to the current temperature of the TWC 22, designated $T_{cat}$, to calculate the amount of time required to increase the current temperature of the TWC 22 from $T_{cat}$ to $T_{lightoff}$, which is designated as $t_{warm-up}$.

At step 104, a determination is made to determine if $t_1$ is less than or equal to $t_{warm-up}$. If $t_1$ is greater than $t_{warm-up}$, then the process returns back to step 100. If, at step 104, $t_1$ is less than or equal to $t_{warm-up}$, then, at steps 106, 108, the air pump 32 and the eHC 24 are both activated.

After the eHC 24 and the air pump 32 have been activated, at step 110, the current temperature $T_{cat}$ is checked again.

At step 112, the current temperature $T_{cat}$ is compared to $T_{lightoff}$. If the current temperature $T_{cat}$ is less than $T_{lightoff}$, then the process returns back to step 110. Since the air pump 32 and the eHC 24 are active, $T_{cat}$ is increasing. Therefore, steps 110 and 112 may be repeated as many times as needed, until $T_{cat}$ is greater than or equal to $T_{lightoff}$. If the current temperature $T_{cat}$ is greater than or equal to $T_{lightoff}$, then, at step 114, ignition of the engine 12 occurs, and both the air pump 32 and eHc 24 are deactivated.

Figure 6:
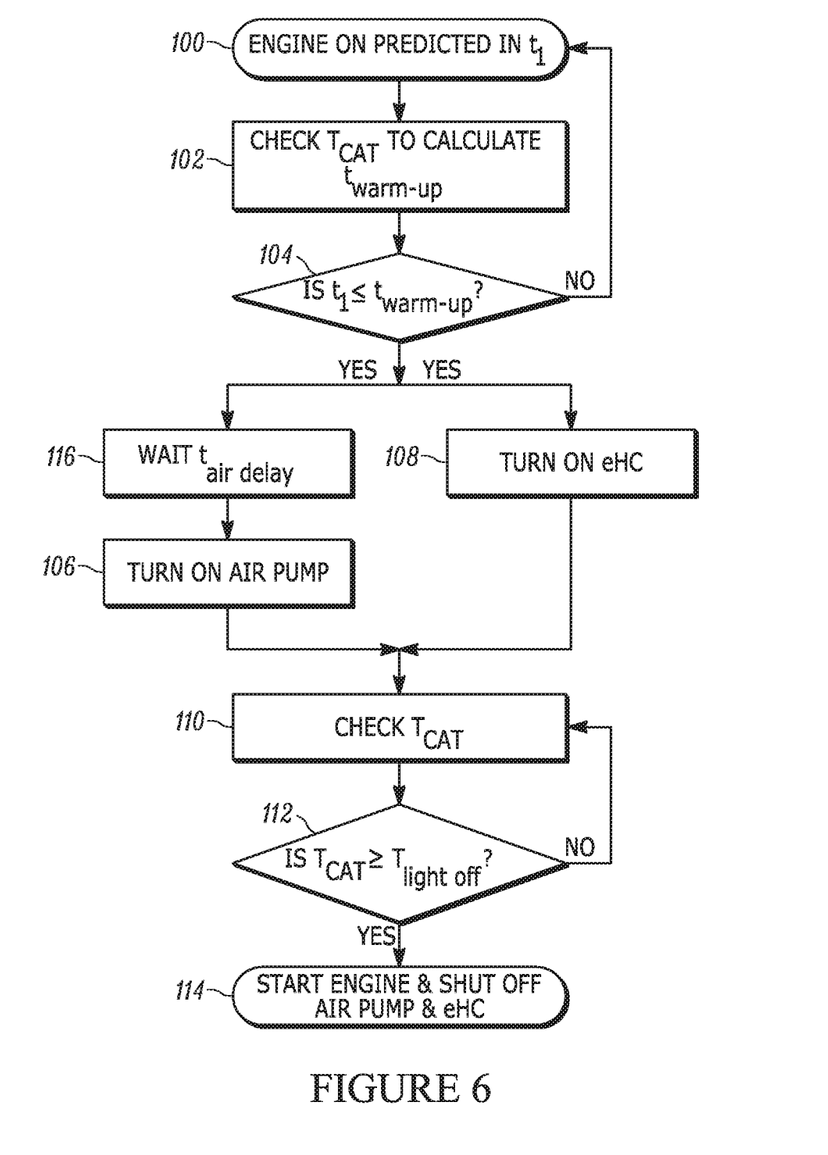
FIG. 6 is a flow chart showing a second example of the steps performed by an exhaust system having a proactive catalyst heating system, according to embodiments of the present invention.

Another example of the steps used in the determination of when to activate the air pump 32 and the eHC 24 prior to ignition of the engine 12, and how long the air pump 32 and eHC 24 should remain active is shown in FIG. 6, with like numbers referring to like elements. In this example, an additional step 116 is added after step 104. After step 104, if $t_1$ is less than or equal to $t_{warm-up}$, then only the eHC 24 is activated at step 108, and a period of time, designated $t_{air\ delay}$, is waited prior to activating the air pump 32 at step 106. The length of $t_{air\ delay}$ is a calibrated time based on size of the eHC 24, which may vary depending upon the vehicle, and the configuration of the exhaust system.

Figure 7:
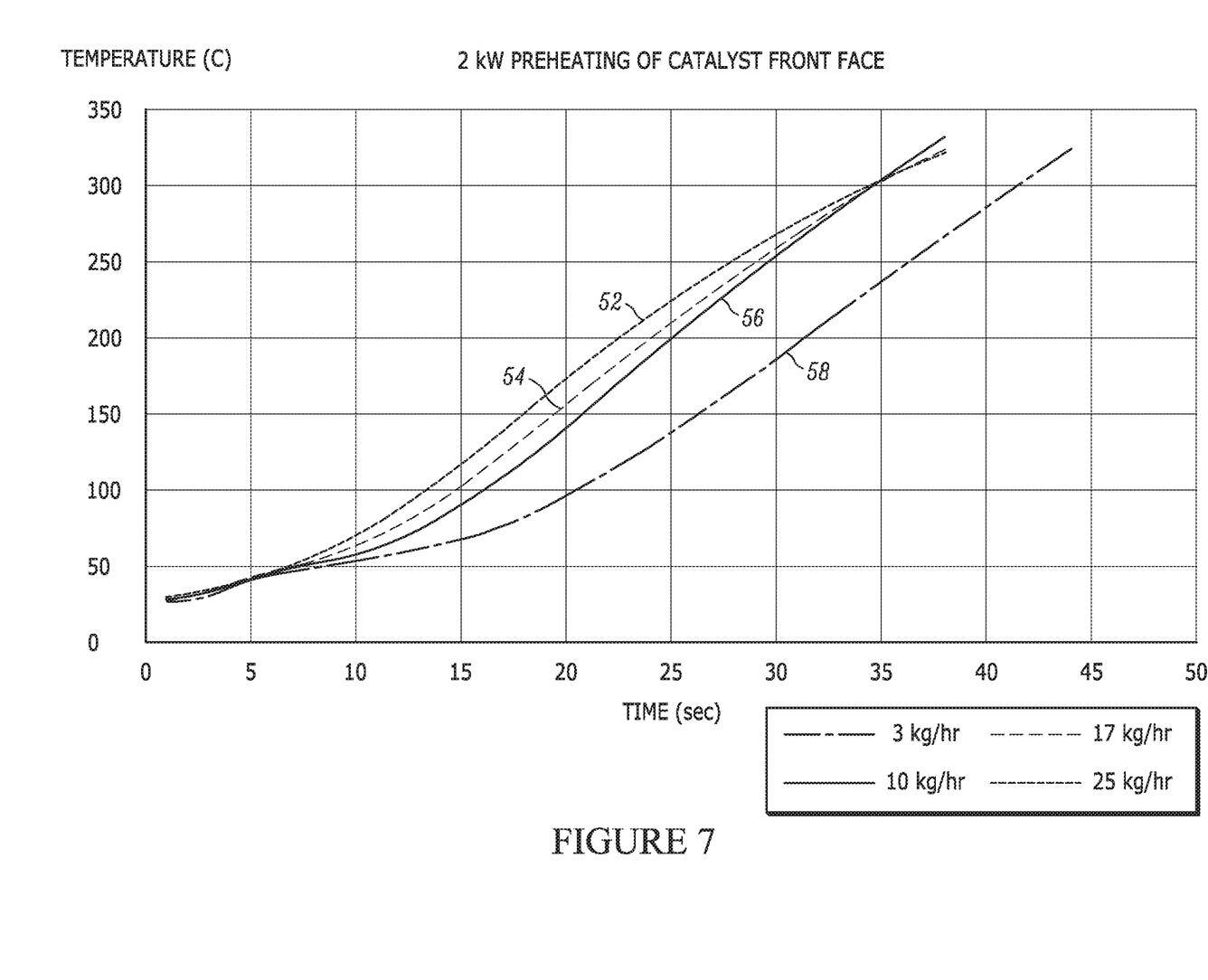
FIG. 7 is a first chart of several variations of an exhaust system incorporating a proactive catalyst heating strategy, according to embodiments of the present invention.
Figure 8:
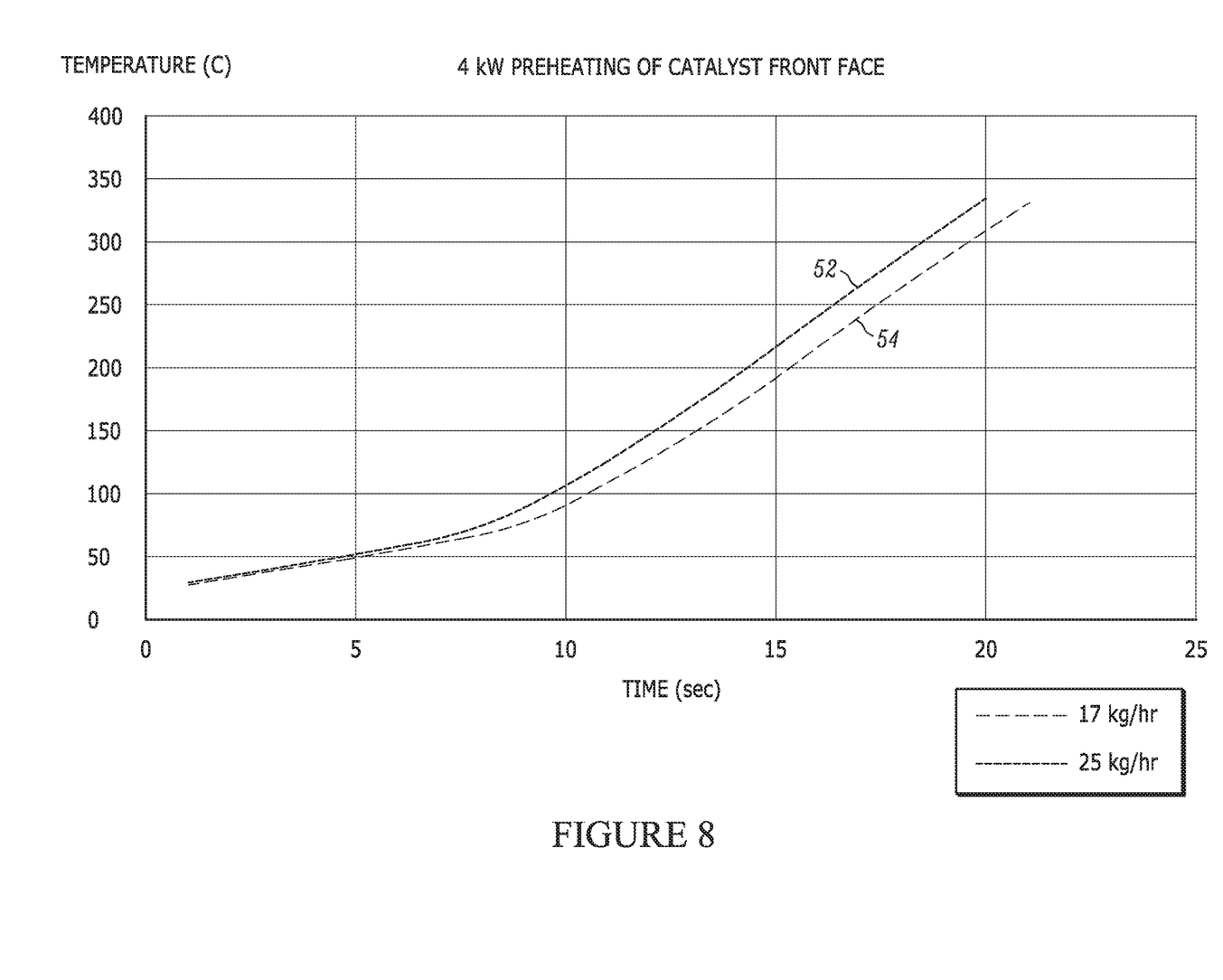
FIG. 8 is a second chart of several variations of an exhaust system incorporating a proactive catalyst heating strategy, according to embodiments of the present invention.

Examples of proactive heating of the TWC 22 are shown in FIGS. 7 and 8. In FIG. 7, a comparison of the $T_{cat}$ and time are shown using different air flow rates generated by the air pump 32, and the eHC 24 is heated using two Kilowatts of power. The first flow rate 52 is 25 kg/hr, the second flow rate 54 is 17 kg/hr, the third flow rate 56 is 10 kg/hr, and the fourth flow rate 58 is 3 kg/hr. As shown in FIG. 7, the time to increase the temperature of the TWC 22 from ambient temperature (approximately 20° C.) to above 300° C. using one of the first three flow rates 52, 54, 56 is approximately 35 seconds. The time to increase the temperature of the TWC 22 from ambient temperature (approximately 20° C.) to above 300° C. using the fourth flow rate 58 is approximately 42 seconds.

Referring now to FIG. 8, another example of a comparison of the $T_{cat}$ and time are shown using different air flow rates generated by the air pump 32. However, in this example, the eHC 24 is heated using four Kilowatts of power. As shown in FIG. 8, the first flow rate 52 and the second flow rate 54 are used. The time for $T_{cat}$ to increase from ambient temperature to above 300° C. using the first flow rate 52 is approximately 18 seconds, and $T_{cat}$ to increase from ambient temperature to above 300° C. using the second flow rate 54 is approximately 19 seconds.

The proactive heating strategy of a catalyst of the present invention may be used for different types of vehicles. One example of a vehicle that would benefit from the proactive heating strategy of the present invention is a plug-in hybrid-electric vehicle (pHEV), or an extended range electric vehicle (E-REV), where the primary drive torque for this particular type of vehicle is obtained from battery power, and the engine 12 is used to provide additional torque as-needed. The proactive heating strategy of the present invention may be used to heat the TWC 22 prior to ignition of the engine 12 after the vehicle has been inactive for an extended period of time, and all of the components of the vehicle are at ambient temperature.

The proactive heating strategy of the present invention may be used to heat the TWC 22 based upon the state-of-charge (SOC) of the battery of the vehicle. For example, when the pHEV is operating under various driving conditions, if it is determined that the SOC has dropped, or is going to drop, below a desired level, and it is predicted that ignition of the engine 12 is going to occur at a predetermined time in the future (i.e., $t_1$ is known), and the engine 12 and charging system of the pHEV are going to be activated to recharge the battery, the proactive heating strategy of the present invention is then used to increase the temperature of the TWC 22 to $T_{lightoff}$ to optimize catalytic conversion of the emissions from the engine 12, prior to ignition of the engine 12.

In another example, the proactive heating strategy of the present invention may be used with a pHEV having autonomous driving capability. In this example, if an autonomous driving path is known, the various torque demands to maneuver along the autonomous driving path are also known, and it is therefore known when ignition of the engine 12 is going to occur. The proactive heating strategy may be used to increase the temperature of the TWC 22 to $T_{lightoff}$, prior to ignition of the engine 12 as the pHEV maneuvers the autonomous driving path.

The proactive heating strategy of the present invention may also be used full hybrid-electric vehicle (HEV), where the primary drive torque for this particular type of vehicle is obtained from the engine 12, and battery is used to provide additional torque as-needed. Again, the proactive heating strategy of the present invention may be used to heat the TWC 22 prior to ignition of the engine 12. In this example, $t_1$ may be known, and is calculated from different functions of the vehicle. Functions such as passive entry, remote vehicle start, detection of the driver sitting in the seat inside the vehicle, or any other type of pre-ignition strategy may be used to determine $t_1$, and therefore when to activate the air pump 32 and the eHC 24.

The use of the proactive heating strategy of the TWC 22 is not limited to the examples above. The proactive heating strategy of the present invention may be used in any type of engine or vehicle where it is beneficial to increase the temperature of a catalyst prior to engine ignition. It should also be noted that the proactive heating system of the present invention is also able to be used with engines that do not have an exhaust manifold.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A proactive heating system for an exhaust system, comprising:
   an exhaust manifold connected to an engine;
   an exhaust treatment device located downstream from the exhaust manifold;
   an air transfer device for directing air towards the exhaust treatment device;
   a canister;
   a purge valve in fluid communication with the canister and the air transfer device; and
   a controller in electrical communication with the exhaust treatment device, the air transfer device, and the purge valve;
   wherein the air transfer device and the exhaust treatment device are configured to be activated by the controller such that the temperature of the exhaust treatment device is increased to a predetermined temperature prior to ignition of the engine, and hydrocarbons in the canister are directed to the exhaust treatment device by the air transferred by the air transfer device such that the exhaust treatment device causes an exothermic reaction to the hydrocarbons, increasing the temperature of the exhaust treatment device to the predetermined temperature prior to ignition of the engine.

2. The proactive heating system for an exhaust system of claim 1, further comprising:
   an intake manifold connected to the engine, and configured to receive air from the atmosphere;
   wherein the air transfer device is configured to divert a portion of the air flowing towards the intake manifold prior to entering the intake manifold and towards the exhaust treatment device.

3. The proactive heating system for an exhaust system of claim 1, the air transfer device further comprising:
   an air pump; and
   a conduit connected to and in fluid communication with the air pump;
   wherein the air pump is configured to direct air towards the exhaust treatment device upstream of the exhaust treatment device.

4. The proactive heating system for an exhaust system of claim 1, the exhaust treatment device further comprising:
   a three-way catalyst; and
   an electrically heated catalyst located in proximity to the three-way catalyst;
   wherein the electrically heated catalyst is configured to heat air from the air transfer device, such that the temperature of the air increases, and passes through the three way catalyst, increasing the temperature of the three-way catalyst, such that the temperature of the three-way catalyst is increased to a predetermined temperature prior to ignition of the engine.

5. The proactive heating system for an exhaust system of claim 4, wherein the electrically heated catalyst is configured to be activated by the controller prior to the activation of the air transfer device.

6. A proactive heating system which is part of an exhaust system for a vehicle, comprising:
   an exhaust system having an intake manifold connected to an engine, and an exhaust manifold connected to the engine;
   an exhaust treatment device;
   a front exhaust pipe providing fluid communication between the exhaust manifold and the exhaust treatment device, such that the exhaust treatment device is downstream of the exhaust manifold;
   an air pump in fluid communication with the front exhaust pipe in an area of the front exhaust pipe upstream of the exhaust treatment device;
   a three-way catalyst, the three-way catalyst being part of the exhaust treatment device;
   an electrically heated catalyst, the electrically heated catalyst being part of the exhaust treatment device;
   a canister;
   a purge valve in fluid communication with the canister and the air pump for controlling a flow of hydrocarbons from the canister to the air pump; and
   a controller in electrical communication with the exhaust treatment device, the air pump, and the purge valve;
   wherein the air pump and the electrically heated catalyst are configured to be activated by the controller such that the air pump transfers air from atmosphere to the front exhaust pipe, the air flows through the electrically heated catalyst, and the electrically heated catalyst increases the temperature of the air, such that as the air flows through the three-way catalyst, the temperature of the three-way catalyst is increased to a predetermined temperature prior to ignition of the engine, and hydrocarbons in the canister are directed into the front exhaust pipe by the air transferred by the air pump such that the electrically heated catalyst causes an exothermic reaction to the hydrocarbons, increasing the temperature of the three-way catalyst.

7. A method for proactively heating a catalyst, comprising the steps of:
   providing an air pump;
   providing an exhaust treatment device;
   providing an engine;
   providing an intake manifold connected to the engine;
   providing an exhaust manifold connected to the engine;
   providing a three-way catalyst being part of the exhaust treatment device;
   providing an electrically heated catalyst being part of the exhaust treatment device;
   providing a canister containing hydrocarbons; and
   providing a purge valve in fluid communication with both of the canister and the air pump;
   activating the air pump and the electrically heated catalyst prior to the ignition of the engine;
   directing air towards the electrically heated catalyst using the air pump;
   heating the air from the air pump using the electrically heated catalyst, such that the temperature of the air passing through the electrically heated catalyst is increased;

increasing the temperature of the three-way catalyst as the heated air passes through the three-way catalyst;

directing the hydrocarbons from the canister to the exhaust treatment device using the air pump such that the electrically heated catalyst causes an exothermic reaction with the hydrocarbons;

controlling the flow of hydrocarbons between the canister and the air pump using the purge valve.

\* \* \* \* \*